(12) United States Patent
Friedman et al.

(10) Patent No.: US 7,801,796 B2
(45) Date of Patent: Sep. 21, 2010

(54) MESSAGE PRIORITIZATION PROCESS AND METHOD

(75) Inventors: Bruce E. Friedman, Monroe, CT (US); John T. Hughes, Jr., Stratford, CT (US); Gopichand Kongani, West Haven, CT (US); Daniel F. Moore, New Haven, CT (US)

(73) Assignee: The NASDAQ OMX Group, Inc., Rockville, MD (US)

( * ) Notice: Subject to any disclaimer, the term of this patent is extended or adjusted under 35 U.S.C. 154(b) by 1070 days.

(21) Appl. No.: 10/301,804

(22) Filed: Nov. 21, 2002

(65) Prior Publication Data

US 2003/0229574 A1 Dec. 11, 2003

Related U.S. Application Data

(60) Provisional application No. 60/385,979, filed on Jun. 5, 2002, provisional application No. 60/385,988, filed on Jun. 5, 2002.

(51) Int. Cl.
*G06Q 40/00* (2006.01)
(52) U.S. Cl. ........................................................ 705/37
(58) Field of Classification Search .................... 705/37
See application file for complete search history.

(56) References Cited

U.S. PATENT DOCUMENTS

| | | | | |
|---|---|---|---|---|
| 3,573,747 A | * | 4/1971 | Adams et al. ................. | 705/37 |
| 5,077,665 A | * | 12/1991 | Silverman et al. ............. | 705/37 |
| 5,905,974 A | * | 5/1999 | Fraser et al. ............... | 705/36 R |
| 6,963,856 B2 | * | 11/2005 | Lutnick et al. ................ | 705/37 |
| 7,155,410 B1 | * | 12/2006 | Woodmansey et al. ........ | 705/37 |
| 7,562,038 B1 | * | 7/2009 | Brumfield et al. ............. | 705/35 |
| 2002/0032632 A1 | * | 3/2002 | Sernet .......................... | 705/37 |
| 2002/0077962 A1 | * | 6/2002 | Donato et al. ................. | 705/37 |
| 2004/0068461 A1 | * | 4/2004 | Schluetter .................... | 705/37 |

* cited by examiner

*Primary Examiner*—Charles R Kyle
*Assistant Examiner*—David L Wood
(74) *Attorney, Agent, or Firm*—Fish & Richardson P.C.

(57) ABSTRACT

A message prioritization process includes an interface process for receiving a primary attributable security interest message and one or more secondary attributable security interest messages placed by the market participant on a securities trading system. The primary attributable security interest message relates to a defined quantity of an individual security traded on the securities trading system. Each secondary attributable security interest message increments the defined quantity of the primary attributable security interest message by an incremental quantity. A code assignment process assigns a superior prioritization code to the primary attributable security interest message and an inferior prioritization code to each secondary attributable security interest message. These prioritization codes control the order in which the attributable security interest messages are processed by a matching process, and the inferior prioritization code is subordinate to the superior prioritization code.

30 Claims, 6 Drawing Sheets

MESSAGE PRIORITIZATION PROCESS AND METHOD

RELATED APPLICATIONS

This application claims the priority of: U.S. Provisional Patent Application No. 60/385,979, entitled "Supermontage Architecture", and filed on Jun. 5, 2002; and U.S. Provisional Patent Application No. 60/385,988, entitled "Security Processor", and filed on Jun. 5, 2002

BACKGROUND

This invention relates to electronic-based securities trading, and more particularly to processing and displaying of information relating to electronic securities trading.

Electronic equity markets, such as The Nasdaq Stock Market™ collect, aggregate, and display pre-trade information to market participants. In the Nasdaq Stock Market, for example, this pre-trade information takes the form of a quote that represents a single or an aggregate of same-priced principal or agency orders. A market, such as The Nasdaq Stock Market™, also provides trading platforms through which market participants may trade securities in the marketplace.

SUMMARY

According to an aspect of this invention, a message prioritization process includes an interface process for receiving a primary attributable security interest message and one or more secondary attributable security interest messages placed by the market participant on a securities trading system. The primary attributable security interest message relates to a defined quantity of an individual security traded on the securities trading system. Each secondary attributable security interest message increments the defined quantity of the primary attributable security interest message by an incremental quantity. A code assignment process assigns a superior prioritization code to the primary attributable security interest message and an inferior prioritization code to each secondary attributable security interest message. These prioritization codes control the order in which the attributable security interest messages are processed by a matching process, and the inferior prioritization code is subordinate to the superior prioritization code.

One or more of the following features may also be included. The prioritization codes are timestamps or sequential numbers. A message output process provides the primary and secondary attributable security interest messages to a matching process that compares, based on prioritization codes, the primary and secondary attributable security interest messages with previously-received attributable security interest messages to determine if a match occurs between any of these attributable security interest messages.

A parent-child process links the primary and secondary attributable security interest messages. A quantity summing process sums the defined quantity of the primary attributable security interest message with the incremental quantities of the secondary attributable security interest messages for reporting purposes while maintaining the autonomy of the primary and secondary attributable security interest messages for processing purposes. A reporting process provides the sum of the defined quantity and the incremental quantities to a trade data output process that transmits trade data to recipients concerning the processing of the primary and secondary attributable security interest messages. One or more of the secondary attributable security interest messages decrements the defined quantity of the primary attributable security interest message by a decremental amount. A quantity decrementation process modifies the primary attributable security interest message to reduce the defined quantity by the decremental amount.

According to a further aspect of this invention, a message prioritization method includes receiving a primary attributable security interest message placed by a market participant on a securities trading system. The primary attributable security interest message relates to a defined quantity of an individual security traded on the securities trading system. One or more secondary attributable security interest messages, which were placed by the market participant, are received. Each secondary attributable security interest message increments the defined quantity of the primary attributable security interest message by an incremental quantity; such that the primary attributable security interest message is processed by a matching process prior to the secondary attributable security interest messages.

One or more of the following features may also be included. A superior prioritization code is assigned to the primary attributable security interest message. An inferior prioritization code is assigned to each secondary attributable security interest message. These prioritization codes control the order in which the attributable security interest messages are processed by the matching process, and the inferior prioritization code is subordinate to the superior prioritization code. The prioritization codes are timestamps or sequential numbers.

The primary and secondary attributable security interest messages are provided to a matching process that compares, based on prioritization codes, the primary and secondary attributable security interest messages with previously-received attributable security interest messages to determine if a match occurs between any of these attributable security interest messages. The secondary attributable security interest messages are linked to the primary attributable security interest messages. The defined quantity of the primary attributable security interest message is summed with the incremental quantities of the secondary attributable security interest messages for reporting purposes while maintaining the autonomy of the primary and secondary attributable security interest messages for processing purposes. The sum of the defined quantity and the incremental quantities is provided to a trade data output process that transmits trade data to recipients concerning the processing of the primary and secondary attributable security interest messages. One or more of the secondary attributable security interest messages decrements the defined quantity of the primary attributable security interest message by a decremental amount. The primary attributable security interest message is modified to reduce the defined quantity by the decremental amount.

According to a further aspect of this invention, a computer program product resides on a computer readable medium having a plurality of instructions stored on it. When executed, these instructions cause a processor to receive a primary attributable security interest message placed by a market participant on a securities trading system. The primary attributable security interest message relates to a defined quantity of an individual security traded on the securities trading system. One or more secondary attributable security interest messages, which are placed by the market participant, are received. Each secondary attributable security interest message increments the defined quantity of the primary attributable security interest message by an incremental quantity.

The primary attributable security interest message is processed by a matching process prior to the secondary attributable security interest messages.

One or more of the following features may also be included. A superior prioritization code is assigned to the primary attributable security interest message, and an inferior prioritization code is assigned to each secondary attributable security interest message. These prioritization codes control the order in which the attributable security interest messages are processed by the matching process, and inferior prioritization codes are subordinate to the superior prioritization code. The prioritization codes are timestamps or sequential numbers.

The primary and secondary attributable security interest messages are provided to a matching process that compares, based on prioritization codes, the primary and secondary attributable security interest messages with previously-received attributable security interest messages to determine if a match occurs between any of these attributable security interest messages. The secondary attributable security interest messages are linked to the primary attributable security interest messages. The defined quantity of the primary attributable security interest message is summed with the incremental quantities of the secondary attributable security interest messages for reporting purposes. However, the autonomy of the primary and secondary attributable security interest messages is maintained for processing purposes. The sum of the defined quantity and the incremental quantities is provided to a trade data output process that transmits trade data to recipients concerning the processing of the primary and secondary attributable security interest messages. One or more of the secondary attributable security interest messages decrements the defined quantity of the primary attributable security interest message by a decremental amount. The primary attributable security interest message is modified to reduce the defined quantity by the decremental amount.

According to a further aspect of this invention, a message prioritization system includes a matching queue for receiving and queuing attributable security interest messages for subsequent processing. An interface process obtains, from the matching queue, a primary attributable security interest message and one or more secondary attributable security interest messages placed by a market participant on a securities trading system. The primary attributable security interest message relates to a defined quantity of an individual security traded on the securities trading system. Each secondary attributable security interest message increments the defined quantity of the primary attributable security interest message by an incremental quantity. A code assignment process assigns a superior prioritization code to the primary attributable security interest message, while an inferior prioritization code is assigned to each secondary attributable security interest message. These prioritization codes control the order in which the attributable security interest messages are processed by a matching process, and the inferior prioritization code is subordinate to the superior prioritization code.

One or more of the following features may also be included. The matching queue is a first-in, first-out queue maintained on a non-volatile memory.

According to a further aspect of this invention, a message prioritization system includes an interface process for receiving a primary attributable security interest message and one or more secondary attributable security interest messages placed by the market participant on a securities trading system. The primary attributable security interest message relates to a defined quantity of an individual security traded on the securities trading system, and each secondary attributable security interest message increments the defined quantity of the primary attributable security interest message by an incremental quantity. A code assignment process assigns a superior prioritization code to the primary attributable security interest message, while an inferior prioritization code is assigned to each secondary attributable security interest message. These prioritization codes control the order in which the attributable security interest messages are processed by a matching process, and the inferior prioritization code is subordinate to the superior prioritization code. A matching process, which obtains the primary and secondary attributable security interest messages from the code assignment process, compares, in an order based on prioritization codes, the primary and secondary attributable security interest messages with previously-received attributable security interest messages to determine if a match occurs between any of these attributable security interest messages.

One or more of the following features may also be included. The matching process includes an order management process for managing the attributable security interest messages obtained from the code assignment process. The matching process includes an order book, responsive to the order management process, for storing the attributable security interest messages obtained from the code assignment process. The arrangement of the attributable security interest messages within the order book is governed, in part, by the prioritization code of each attributable security interest message.

One or more advantages can be provided from the above. The priority of the original attributable security interest is maintained even though the number of shares specified in that message is increased. Further, the differential amount of shares (i.e., the new amount less the original amount) specified in any new message that modifies the original message is prioritized based on the order of receipt of these new messages. By maintaining these share amounts separate and discrete for processing purposes, the messages are processed in the order in which they were received. Additionally, by combining these amounts for reporting purposes, the user is provided with a concise and simplified display that is easy to read and follow.

DETAILED DESCRIPTION

Figure 1:
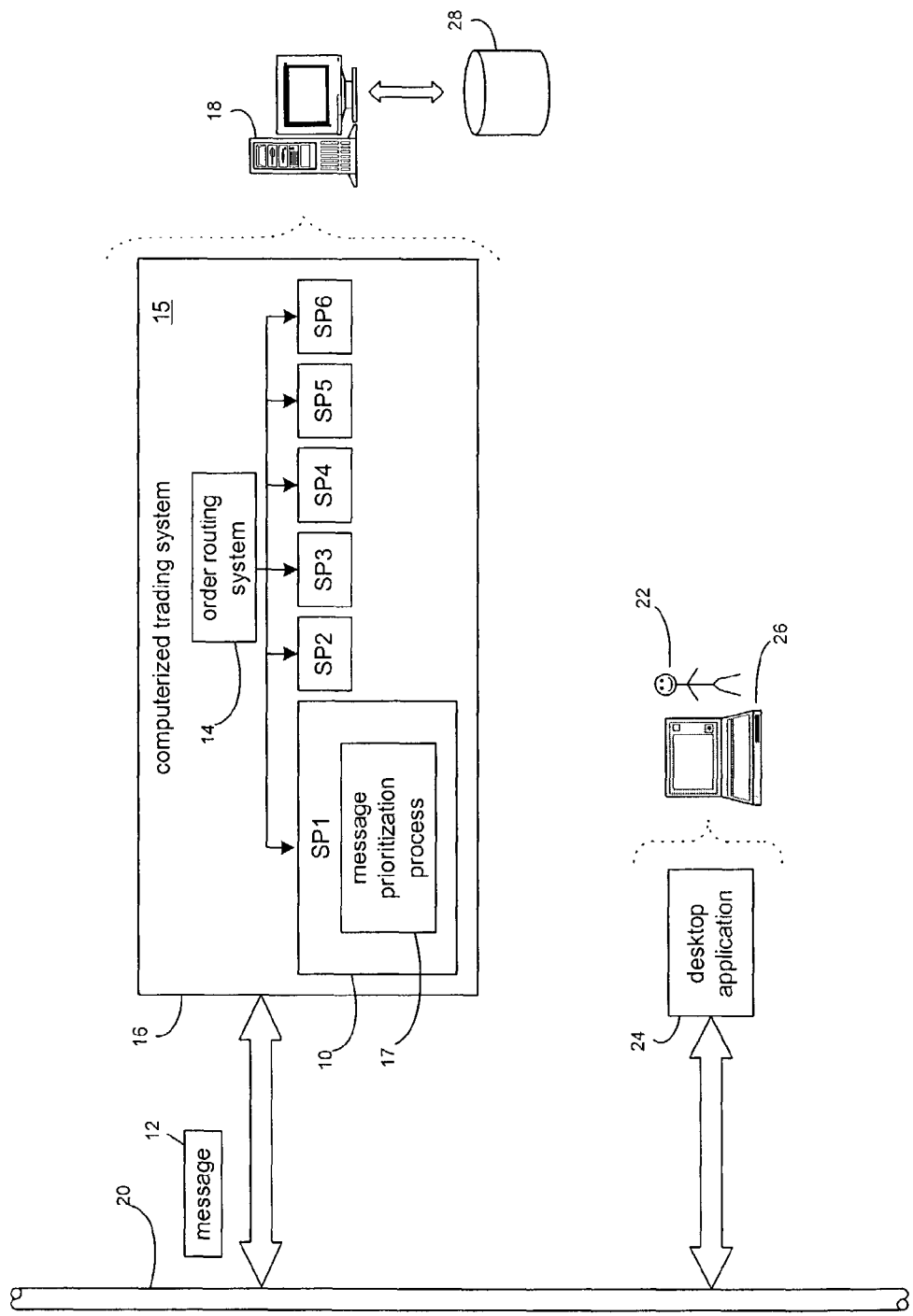
FIG. 1 is a block diagram of a parallel architecture including a securities processor and an order routing system.

Referring to FIG. 1, there is shown a securities processor 10 that processes attributable security interest messages 12 concerning a specific security received from a order routing system 14. Securities processor 10 and order routing system 14 form a multi-parallel architecture 15 that is incorporated into and part of a computerized trading system 16. Computerized trading system 16 trades securities including the specific security that is the subject of received message 12. The securities processor 10 processes attributable security interest messages 12 and effectuates the trading of the security. By assigning certain securities to certain securities processors, a single securities processor is not required to process all of the attributable security interest messages 12 handled by the computerized trading system 16. Accordingly, the load distribution amongst the securities processors within the system can be controlled and the efficiency and throughput of the system can be enhanced.

Each securities processor (e.g., securities processor 10) includes a message prioritization process 17 that prioritizes the attributable security interest messages 12 routed by order routing system 14.

Securities processor 10 and order routing system 14 reside on a server 18 that is connected to network 20 (e.g., the Internet, an intranet, a local area network, some other form of network, etc.). Computerized trading system 16, which trades securities electronically, processes trades (e.g., message 12) entered by various market participants (e.g., market participant 22). Market participant 22 typically accesses and uses computerized trading system 16 via a desktop application 24 (e.g., Microsoft Internet Explorer™, Netscape Navigator™, the Nasdaq Workstation II™, a specialized desktop interface, etc.) running on computer 26, thus allowing market participant 22 to trade securities with other market participants (not shown).

The instruction sets and subroutines of securities processor 10 and order routing system 14 are typically stored on a storage device 28 connected to server 18. Additionally, computerized trading system 16 stores all information relating to securities trades on storage device 28. Storage device 28 can be a hard disk drive, a tape drive, an optical drive, a RAID array, a random access memory (RAM), or a read-only memory (ROM), for example.

Server 18 includes at least one central processing unit (not shown) and main memory system (not shown). Typically, server 18 is a multi-processing, fault-tolerant system that includes multiple central processing units that each have a dedicated main memory system or share a common main memory pool. While being executed by the central processing unit(s) of server 18, order routing system 14 and multiple instantiations of securities processor 10 reside in the main memory system of server 18. Further, the processes and subroutines of securities processor 10 and order routing system 14 may also be present in various levels of cache memory incorporated into server 18.

Figure 2:
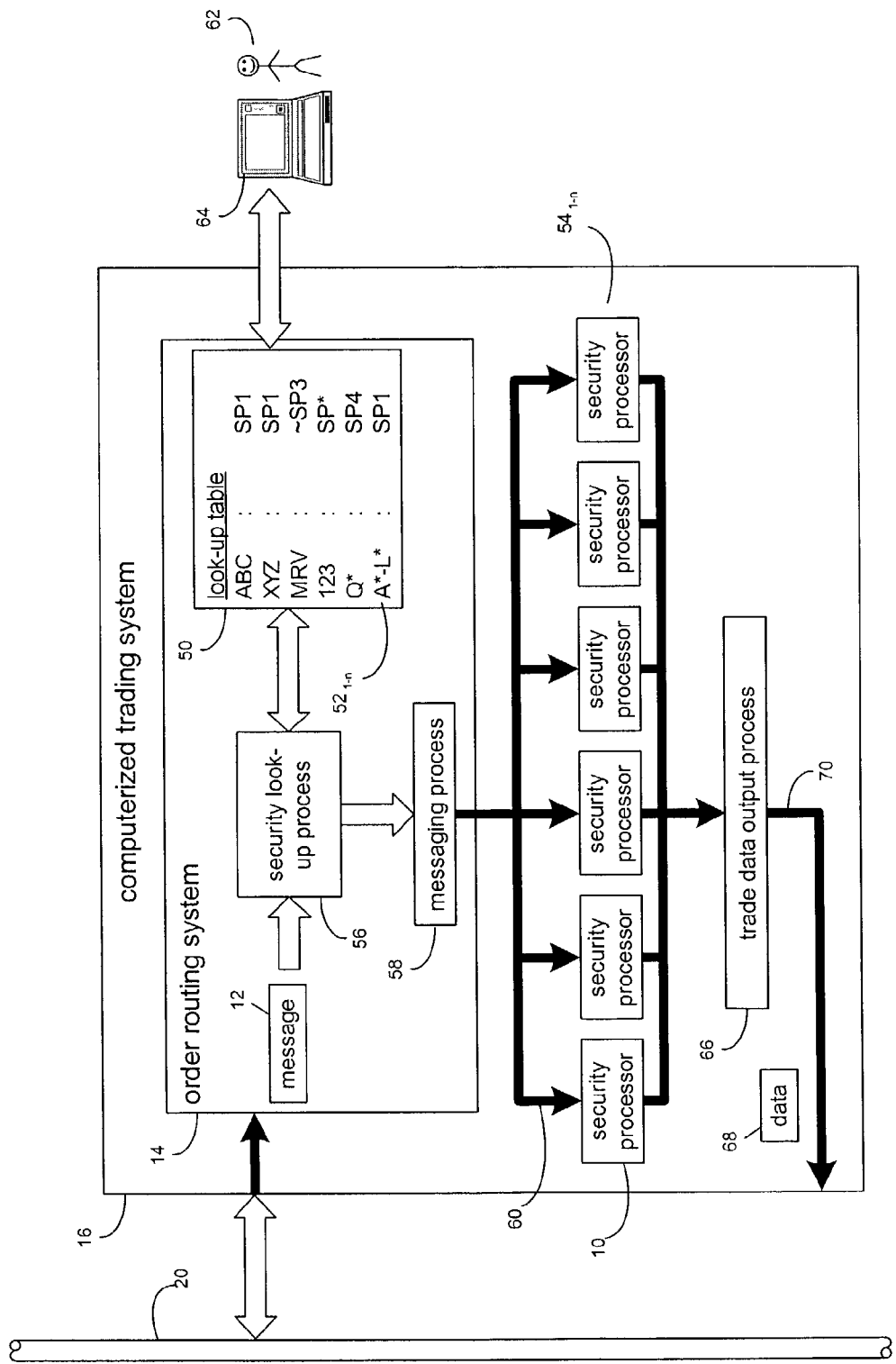
FIG. 2 is a block diagram of the order routing system.

Referring to FIG. 2, order routing system 14 includes a configurable look-up table 50 that includes assignment entries $52_{1-n}$ that assign each of the securities traded on computerized trading system 16 to one or more securities processors $54_{1-n}$ (e.g., securities processor 10). Look-up table 50 can be configured in various forms. For example, table 50 can be a multi-column, multi-row text-based ASCII (i.e., American Standard Code for Information Interchange) file that is accessed to determine the assigned securities processor. Alternatively, look-up table 50 may be a database from which a query is made concerning the security and the appropriate database record is retrieved, such that this database record specifies the securities processor to which that specific security is assigned. Other file arrangements/structures are also possible, such as a comma delimited text file.

During the course of the trading day and, possibly, before and after the trading day, market participants (e.g., market participant 22) place orders/quotes (e.g., message 12) for securities traded on computerized trading system 16. These orders/quotes, which are typically in the form of messages (e.g., message 12), include several pieces of information, such as: the name of the market participant who placed the order/quote; a symbol (or some other identifier) for the security being sought for purchase or offered for sale; and a quantity indicator concerning the number of shares sought for purchase or offered for sale, for example.

When a market participant 22 enters a message 12, this order/quote is transmitted to computerized trading system 16 via network 20. Upon receipt of message 12 by order routing system 14, a security look-up process 56 parses message 12 to determine the security to which the order/quote relates. Typically, security look-up process 56 examines message 12 to find a ticker symbol (or some other identifier) for the security to which the order pertains. Assume that, for this example, message 12 pertains to one-hundred shares of XYZ Corp. that Market Participant A wishes to purchase for $17.00 per share. Security look-up process 56 parses this order and extracts the ticker symbol XYZ that is included in the message body. Alternatively, some other form of identifier can be used (e.g., a binary identifier) provided that assignment entries $52_{1-n}$ use these identifiers to assign the securities processors.

Security look-up process 56 accesses configurable look-up table 50 to determine the securities processor to which ticker symbol XYZ is assigned. As is shown in configurable look-up table 50, security XYZ is assigned to securities processor SP1. Depending on the structure of table 50 (e.g., ASCII table, database, text file, etc), security look up process 56 may scan table 50 (if it is an ASCII table or text file), or may launch a query (if it is a database) to determine which securities processor the security is assigned to. Once this determination is made, messaging process 58 populates the header of the message to include an identifier for the appropriate securities processor. Alternatively, if message 12 does not already include an empty header, the message may be appended to include a header that identifies the assigned securities processor. Once this process is complete, message 12 is broadcast over bus 60 to the assigned securities processor (securities processor 10, for example).

Figure 3:
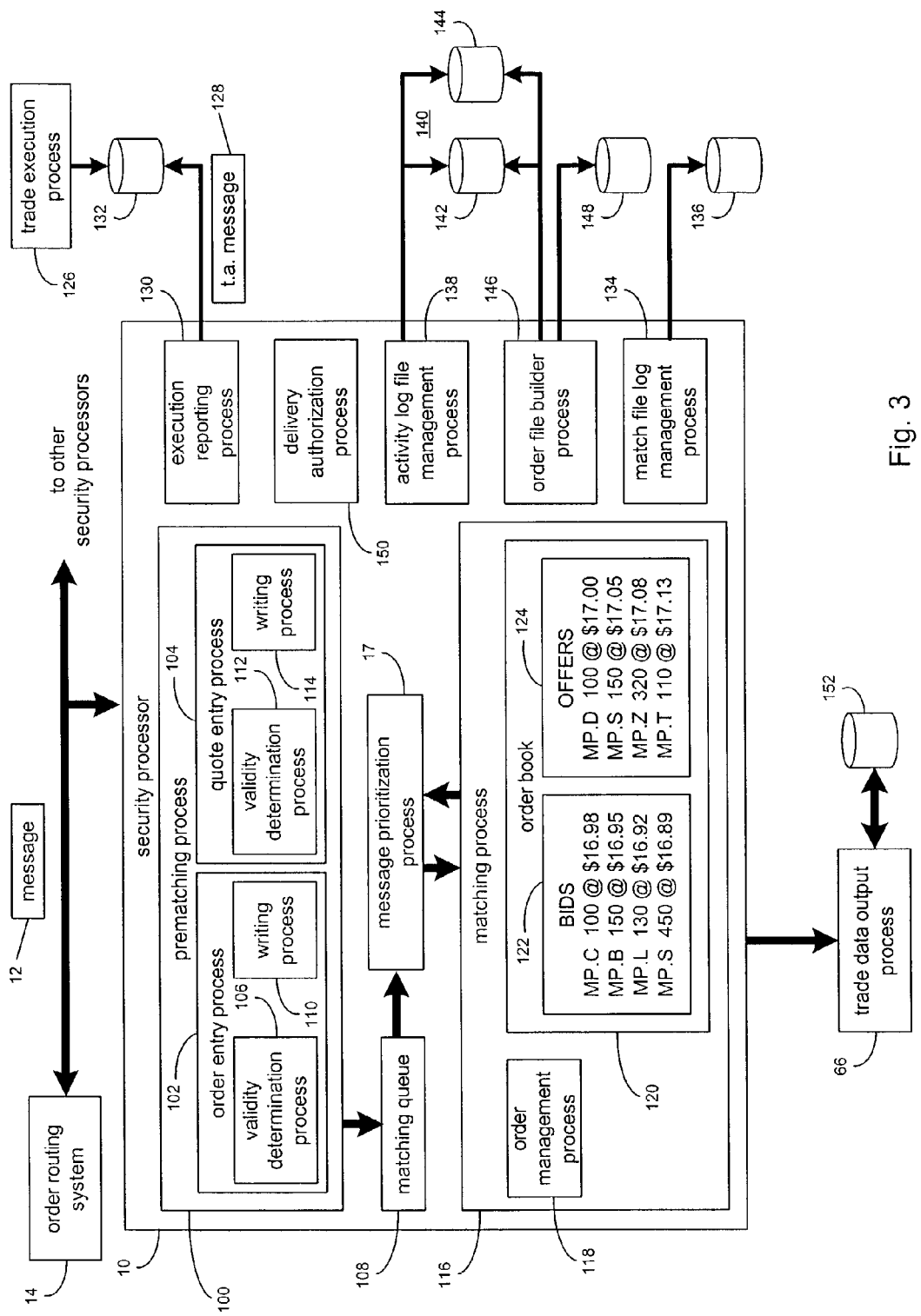
FIG. 3 is a block diagram of the securities processor (including a message prioritization process)

Referring to FIG. 3, once message 12 is received by the securities processor 10, a check is performed by prematching process 100 to make sure that the order/quote passes certain preliminary checks (e.g., order eligibility, order syntax, etc.). The specifics of the checks being performed and the action taken in response to a failure is configured by administrator 62 using computer 64. Typically, if an order/quote fails any of these checks, the order is rejected and the market participant who placed the order is notified.

Prematching process 100 includes order entry process 102 and a quote entry process 104. If message 12 relates to an order that market participant 22 entered, order entry process 102 receives and processes the message 12. Order entry process 102 includes a validity determination process 106 that performs the preliminary checks described above. If the message passes these preliminary checks, this validated message is placed (i.e., written) into a matching queue 108 by a writing process 110.

Alternatively, if message 12 represents a quote, a quote entry process 104 receives and processes message 12. A validity determination process 112 receives and validates the quote. Once validated, the validated message is written into the matching queue 108 by writing process 114.

Matching queue 108 functions as a temporary storage area (i.e., a buffer) for those messages that were received and validated by the securities processor but not yet processed. Matching queue 108 also stores other pending orders, quotes, and supervisory commands for the securities assigned to the securities processor. Matching queue 108 is typically a first-in, first-out (i.e., FIFO) buffer, in which the messages wait in line to be processed. Matching queue 108 is typically configured in a non-volatile memory, such as storage device 28.

Once queued by matching queue 108, these messages/commands wait in line to be processed by message prioritization process 17 (to be discussed below in greater detail) that works in conjunction with matching process 116 to build and maintain an order book (to be discussed below in greater detail) for the security being traded. Once prioritized, these messages (message 12, for example) are provided to matching process 116 for processing.

As stated above, in this example, message 12 pertains to one-hundred shares of XYZ Corp. that Market Participant A wishes to purchase for $17.00 per share. This message, which represents a bid-to-buy XYZ Corp. (hereinafter a "bid"), will be entered into the order book 120 for securities processor 12 for subsequent matching with a corresponding offer-to-sell XYZ Corp (hereinafter an "offer").

Matching process 116 includes an order management process 118 for managing and maintaining the prioritized messages (such as message 12) received from message prioritization process 17. These prioritized messages are entered into an order book 120 that is exclusively controlled by the order management process 118 of matching process 116. Typically, order book 120 is stored in a portion of the main memory (not shown) of server 18 that is exclusively accessible by order management process 118.

Order book 120 includes of two logical portions, a bid-side portion 122 and an ask-side portion 124. Whenever a message is prioritized concerning a bid, the relevant information (e.g., market participant identifier, quantity of shares, bid price, etc.) pertaining to that message is placed into the bid-side portion 122 of order book 120. Conversely, whenever a message is prioritized concerning an offer, the relevant information (e.g., market participant identifier, quantity of shares, ask price, etc.) pertaining to that message is placed into the ask-side portion 124 of order book 120.

During the course of the day, the trade value of the security (XYZ Corp., for example) varies as market conditions fluctuate. Whenever a market participant is offering a security for sale at the same price that another market participant is willing to pay for the security, matching process 116 matches the bid and the offer. Once this match occurs, the trade can be executed by a trade execution process 126. However, if the highest-price (i.e., best price) bid is lower than the lowest-price (i.e., best price) offer, no match will occur and, therefore, the security will not be traded. These pending bids and offers will remain on that security's order book 120. This price differential between the lowest-price offer and the highest-price bid is commonly referred to as the "spread". For order book 120, the price spread is $0.02, as Market Participant C has a pending (i.e., unmatched) bid to buy one-hundred shares for $16.98 per share, and Market Participant D has a pending offer to sell one-hundred shares for $17.00 per share. Therefore, until something changes (i.e., Market Participant C raises their bid to $17.00, Market Participant D lowers their offer to $16.98, the two market participant meet at $16.99, or a third party makes a $17.00 bid or a $16.98 offer), no trades will occur.

Continuing with the above-stated example, when prioritized message 12 is retrieved from message prioritization process 17, as it is a bid to buy one-hundred shares of XYZ Corp. for $17.00 per share, it is placed into the bid-side 122 of order book 120. Once placed on order book 120, this unmatched bid is matched with an unmatched offer, namely the outstanding offer to sell one-hundred shares of XYZ Corp. for $17.00 per share that was placed by Market Participant D.

Assuming that neither of the two market participants involved in this match have requested a delivery notification (to be discussed below), a trade authorization message 128, which is generated by an execution reporting process 130, is transmitted to an execution trigger (i.e., a log file) 132 accessible by a trade execution process 126. Trade execution process 126 effectuates the trade by transferring ownership of the shares of XYZ Corp. from the seller's to the buyer's account, and transferring funds from the buyer's to the seller's account. Once a bid or an offer is matched, order management process 118 removes it from order book 120, as it is no longer available for matching.

Figure 4:
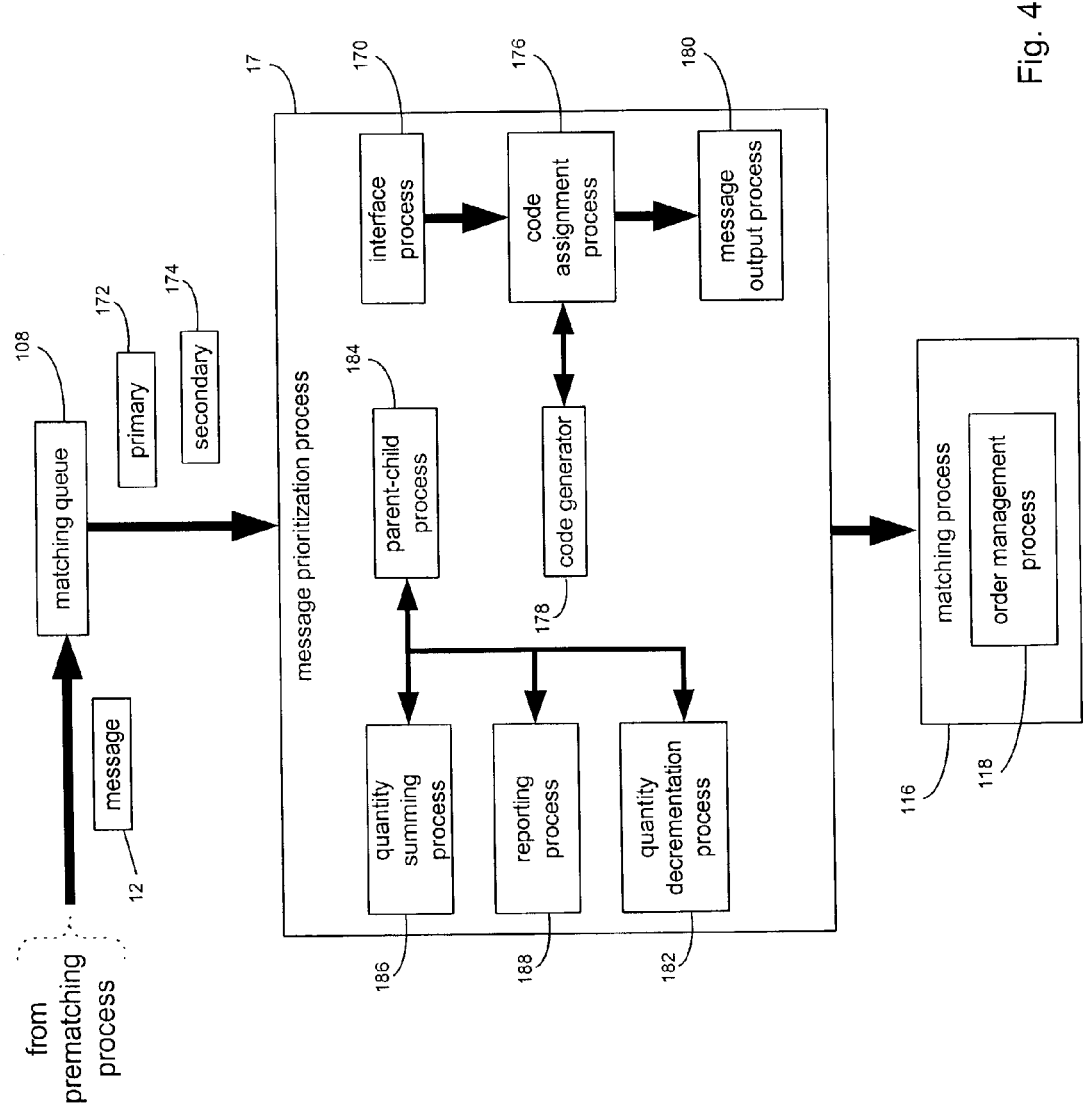
FIG. 4 is a block diagram of the message prioritization process.

Referring to FIG. 4, message prioritazion process 17 works in conjunction with order management process 118 of matching process 116 to arrange the prioritized attributable security interest messages 12 within order book 120.

Message prioritazion process 17 includes an interface process 170 for receiving attributable security interest messages 12 from matching queue 108 so that they can be prioritized and arranged within the order book. These attributable security interest messages 12 can be either primary attributable security interest messages 172 or secondary attributable security interest messages 174. When receiving these messages, a code assignment process 176 assigns a prioritization code to each of these messages. These prioritazion codes, which indicate the order in which the messages were received by the prioritization process 17, are obtained from a code generator 178. As these prioritization codes may be, for example, time stamps or sequential numbers, code generator 178 may be a clock (for time stamps) or a counter (for sequential numbers), for example. These prioritization codes control, in part, the order in which the matching process positions the messages within the order book 120. This will be discussed below in greater detail.

Once these prioritization codes are assigned, message output process 180 provides these prioritized messages to matching process 116: These messages are then arranged within the order book by order management process 118.

Two of the types of messages received by message prioritazion process 17 are primary and secondary attributable security interest messages. A primary attributable security interest message 172 is a message generated by a market participant concerning a specific quantity of a certain security that is sought or offered at a certain price. A secondary attributable security interest message 174 is any subsequent message generated that increases the specific quantity specified in the primary message 172, provided that primary message was not already matched by the matching process 116.

As shown in FIG. 3, Market Participant D has an outstanding offer to sell one hundred shares of XYZ Corp. for $17.00 per share. As Market Participant D has no other outstanding offers to sell shares of XYZ Corp. for $17.00 per share, the message related to this order book entry is a primary attributable security interest message 172. Note that if Market participant F generated a message concerning an offer to sell shares of XYZ Corp. for $17.00 per shares, this is not a secondary attributable security interest message, as it does not have a common market participant. Further, if Market Participant D generated a message concerning an offer to sell shares of XYZ Corp. for $17.02 per share, this also is not a secondary attributable security interest message, as it does not have a common price.

However, if Market Participant D decided to increase their offer to sell shares of XYZ Corp. from one-hundred shares to one-hundred-fifty shares, a new message would be generated concerning Market Participant D's offer to sell an additional fifty shares of XYZ Corp. for $17.00 per share. This new message, which represent the differential quantity (i.e., fifty shares) between the original offer (i.e., one-hundred shares) and the new offer (i.e., one-hundred-fifty shares), is considered a secondary attributable security interest message, as it concerns the same security offered for sale by the same market participant for the same asking price.

When received by interface process 170, code assignment process 176 assigns this secondary attributable security interest message 174 with a unique assignment code that is different from that of the primary attributable security interest message 172. As the primary attributable security interest message 172, by definition, is received prior to the secondary attributable security interest message 174, the prioritization code for the primary message is superior to that of the secondary message, which is inferior. Superior and inferior prioritization codes are intended to mean that, for timestamps, the primary message has an earlier time stamp than the secondary message. For sequential numbering, the primary message has a lower prioritization code than the secondary message.

If Market Participant D wishes to increase their offer to sell shares of XYZ Corp. (for $17.00 per share) from one-hundred-fifty shares to two-hundred-fifty shares, a third attributable security interest message is generated. Therefore, three messages have been generated thus far: one primary attributable security interest message for an offer to sell one-hundred shares of XYZ Corp. for $17.00 per share; a first secondary attributable security interest message for an offer to sell fifty shares of XYZ Corp. for $17.00 per share; and a second secondary attributable security interest message for an offer to sell one-hundred shares of XYZ Corp. for $17.00 per share. Each of these three messages has a unique prioritization code.

As stated above, the order book 120 is divided into two portions, a bid-side portion 122 and an ask-side portion 124. Whenever a message is received concerning a bid, the relevant information (e.g., market participant identifier, quantity of shares, bid price, etc.) pertaining to that message is placed into the bid-side portion 122 of order book 120. Conversely, whenever a message is received concerning an offer, the relevant information (e.g., market participant identifier, quantity of shares, ask price, etc.) pertaining to that message is placed into the ask-side portion 124 of order book 120. The entries entered into each of these portions are organized based on bid or ask price. Therefore, the primary order criterion is the bid or ask price. Concerning entries that have the same bid or ask price, these entries are sorted based on their prioritization codes. Accordingly, if in between the primary attributable security interest message (i.e., 100@$17.00 per share) and the first of the secondary attributable security interest messages (i.e., 50@$17.00 per share) entered by Market Participant D, Market Participant Q enters an offer to sell three-hundred shares of XYZ Corp. for $17.00 each, the ask-side portion 124 of order book 120 would appear as follows:

| OFFERS | |
| --- | --- |
| Market Participant D | 100 @ $17.00 per share |
| Market Participant Q | 300 @ $17.00 per share |
| Market Participant D | 50 @ $17.00 per share |
| Market Participant D | 100 @ $17.00 per share |
| Market Participant S | 150 @ $17.05 per share |
| Market Participant Z | 320 @ $17.08 per share |
| Market Participant T | 110 @ $17.13 per share |

As these outstanding (i.e., unmatched) offers are matched by matching process 116, they are matched "best price" first. For offers-to-sell, the best price is the lowest price. Note that there are four entries that represent offers to sell shares of XYZ Corp. for $17.00 per share. The order in which these identically-priced offers are processed is based on their position within the order book 120, and the positioning of these entries within the order book is based on the prioritization codes assigned by the message prioritization process 17. For this reason, the offer entered by Market Participant Q will be processed prior to the first or second secondary attributable security interest messages entered by Market Participant D. Accordingly, if Market Participant R enter a bid to buy four-hundred shares of XYZ Corp. for $17.00 per share, this bid will be matched with the primary attributable security interest message entered by Market Participant D (e.g., 100@$17.00 per share) and the primary attributable security interest message entered by Market Participant Q (i.e., 300@$17.00 per share). Note that the first (i.e., 50@$17.00 per share) and second (i.e., 100@$17.00 per share) secondary attributable security interest messages entered by Market Participant D will not be processed until a subsequent compatible bid is received by matching process 116.

Thus far, all the secondary attributable security interest messages generated by Market Participant D have concerned increasing the amount of shares sought for purchase or offered for sale. In the event that a market participant generates a secondary attributable security interest message that decreases the number of shares that a market participant wishes to buy or is offering to sell, that message is immediately processed by a quantity decrementation process 182. Quantity decrementation process 182, which is interfaced with order management 118, decrements the quantity of the previous message sent by the market participant.

Accordingly, when secondary attributable security interest messages decrease the quantity of shares sought or offered, these messages are not maintained as separate messages within the order book and are immediately processed. For example, if Market Participant D generates a third secondary attributable security interest message in which they reduce the number of shares offered for sale (currently at two-hundred-fifty) by seventy five, the quantity of the second secondary attributable security interest message will be reduced from one-hundred to twenty-five. Thus lowering the total number of shares offered for sale to one-hundred-seventy-five.

If Market Participant again wished to lower the quantity of shares offered for sale (currently at one-hundred-seventy-five) by an additional one-hundred-twenty-five, the quantity of the second secondary attributable security interest message (currently at twenty-five) would be reduced to zero and the message deleted from the order book. The quantity of the first secondary attributable security interest message (currently at fifty) would also be reduced to zero and the message deleted from the order book. Further the quantity of the primary attributable security interest message (currently at one hundred) would be reduced to fifty.

Order management process 118 is configured so that if a supervisory command is retrieved from message prioritization process 17, order management process 118 executes that supervisory command. For example, if a "stop trading" command is received for all securities assigned to securities processor 10, order management process 118 will stop matching process 116 for all securities handled by that securities processor, effectively stopping all trading for that securities processor. If each securities processor simultaneously received the same supervisory command, all trading on computerized trading system 16 would cease. Further, if a "stop trading" command is received for a specific security assigned to securities processor 10, order management process 118 will shut down matching process 116 for that particular security while allowing any other matching processes being handled by securities processor 10 to continue.

A match file log management process 134 maintains a match log file 136 that itemizes the matches made by matching process 116. An activity log file management process 138 maintains an activity log file 140 that specifies the chronological changes made to the order book 120 by the order book management process 118. The activity log file 140 is typically split into two separate files or portions, an order log activity file 142 and a quote log activity file 144. Therefore, whenever changes are made to the order book 120 due to messages concerning orders, these changes are specified in the order log activity file 142. Conversely, whenever changes are made to the order book 120 due to messages concerning quotes, these changes are specified in the quote log activity file 144. Typically, the log activity files 142, 144 are appended each time a change is made to the order book 120 and, therefore, provide a chronological sequence of changes made to the order book 120 during the trading day. An order file builder process 146 accesses and uses the chronological information included in activity log files 142, 144 to build an order book recovery file 148 that is used to recreate/restore order book 120 in the event of a hardware or data failure on server 18.

This order book recovery file is assembled by examining the sequence of events chronicled on activity log files 142, 144 to determine if a bid or offer is still pending on the order book. For example, message 12 pertains to one-hundred shares of XYZ Corp. that Market Participant A wishes to purchase for $17.00 per share. When this unmatched bid was placed on order book 120, the order book was modified to include this bid. This unmatched bid was subsequently matched with an unmatched offer previously written to order book 120, namely the outstanding offer to sell one-hundred shares of XYZ Corp. for $17.00 per share that was placed by Market Participant D. Once this match occurred, the bid by Market Participant A and the offer by Market Participant D were both removed from order book 120. Therefore, the order activity log file 142 would indicate the following: an offer by Market Participant D was written to order book 120; a bid by Market Participant A was written to order book 120; and this bid and this offer were both subsequently removed from the order book 120. Accordingly, these four pieces of chronological information would be processed by order file builder process 146 when producing order book recovery file 148, which would show that the order book 120 does not currently contain either the offer made by Market Participant D or the bid made by Market Participant A.

As stated above, market participants may request that a delivery notification be sent to them prior to processing their bid/offer. For example, once matching process 116 matches an offer with a bid, the owner of the offer and/or the owner of the bid can be notified to request authorization to execute the trade. Therefore, when the match described above between Market Participant A and Market Participant D occurred, a delivery authorization process 150 may request from either or both of the market participants an authorization to have the trade effectuated. If either or both market participants requested this authorization, delivery authorization process 150 would request a transaction authorization from either or both of them. In this scenario, the trade authorization message 128 is sent to the execution trigger 132 when the transaction authorization is received by the securities processor.

Whenever a match occurs, an order fails to match with another outstanding offer within a predetermined period of time (e.g., immediately, during the trading day, etc.), or an order is rejected by prematching process 100, a trade data output process 66 transmits trade data 68 to the market participant who placed the order. This trade data will vary depending on the action taken by securities processor 10. For example, if the order was rejected, the market participant will typically receive a message specifying that the order was rejected and the reasons for the rejection (e.g., negative volume, negative share price, etc.). If the order was executed, the market participant may receive a message specifying that the order was executed and defining the number of shares sold and the per-share price. If the order failed to execute, the message received by the market participant would typically specify the reason for the failure (e.g., order did not execute immediately, order did not execute by the close of trading, etc.). Further, trade data output process 66 may broadcast trade data 68 concerning the contents of the order book 120. These notification messages are broadcast across output bus 70 which is connected to network 14.

Trade data output process 66 retrieves the information included in match log file 136 and log activity files 142, 144 from all of the securities processors in system 16 and produces an archive file 152. The trade data output process 66 is configured to respond to market participant queries of archive file 152 by retrieving the desired information from the archive file. In some implementations, archive file 152 is partitioned to increase access efficiency.

While primary and secondary attributable security interest messages are maintained as separate and distinct messages for processing by matching process 116, these messages are linked by a parent-child linking process 184 (FIG. 4) that links all related primary and secondary attributable security interest messages. This linking is used primarily for reporting purpose, in that the outstanding offers/bids entered by a single market participant having a common ask/bid price are consolidated prior to being reported. This allows for the market participant to be provided with a concise, consolidated report of attributable interests.

For example, Market Participant D currently has three outstanding offers, namely: one primary attributable security interest message for an offer to sell one-hundred shares of XYZ Corp. for $17.00 per share; a first secondary attributable security interest message for an offer to sell fifty shares of XYZ Corp. for $17.00 per share; and a second secondary attributable security interest message for an offer to sell one-hundred shares of XYZ Corp. for $17.00 per share. These offers are displayed to the market participant (or some other user if authorized or desired) as a single outstanding offer to sell two-hundred-fifty shares of XYZ Corp. for $17.00 per share. A quantity summing process 186 (FIG. 4) sums these discrete outstanding offers and this summed amount (included in a report or an on-screen display) is provided by reporting process 188 (FIG. 4) to the trade data output process 66 of security processor 10. Therefore, the market participant is provided with concise and consolidated information concerning the status of order book 120.

Administrator 62 (via computer 64 and a configuration utility running on it) can configure and reconfigure configurable look-up table 50 to vary the load distribution between the securities processors $54_{1-n}$ or the overall load of the computerized trading system 16. The manner in which table 50 is modified varies depending on the configuration of the table. If the table is an ASCII-based table or text file, a simple text or ASCII line editor may be used to assign and reassign securities to various securities processors. Alternatively, if table 50 is configured as a database, database editing/configuration software (such as that offered by Sybase®, Microsoft®, and Oracle®) may be used to add, delete, or modify records within the database.

As explained above, the matching of the orders and quotes placed by the market participants is handled by the securities processors incorporated into computerized trading system 16. The greater the number of securities processors employed, the greater the throughput of computerized trading system 16. Specifically, as the number of securities processors is increased, the number of matches that system 16 is capable of handling is also increased.

As would be expected, bigger well-know securities tend to be traded at higher volumes than smaller less-known securities. Accordingly, administrator 62 may assign one or more of their highest volume securities to a single securities processor, such that another securities processor handles all the remaining securities: Additionally, as the look-up table is reconfigurable, these definitions can be reassigned as trading trends vary. For example, assume that XYZ Corp. is the highest traded stock handled by computerized trading system 16 and, therefore, administrator 62 only assigned XYZ Corp. to the first of the six securities processors, such that the second through the sixth securities processors handle the trades of all other securities traded on the system 16. If, over time, XYZ Corp. starts to trade less frequently and ABC Corp. (another security traded on computerized trading system 16) becomes the highest traded security, administrator 62 could easily reassign XYZ Corp. so that it is processed by any of securities processors two through six, thus freeing up the first securities processor to exclusively process trades of ABC Corp.

Since additional securities processors can be added to system 16 to accommodate higher trade volumes, computerized trading system 16 is scalable. For example, if administrator 62 decided that the load level of all six securities processors were too high and, therefore, reassigning securities from one securities processor to another would not free up any bandwidth, a seventh securities processor can be added to system 16. This new securities processor would be given a unique address or identifier and look-up table 50 would be modified so that one or more securities are assigned to this newly-added securities processor. Additionally, as these securities processors are each autonomous processors that run separately and independently of each other, the new securities processor may be added and tested without jeopardizing the stability of computerized trading system 16. For example, a seventh securities processor may be added and, prior to this newly-added securities processor executing trades of actual securities, it can be tested. A batch test-procedure can be used to trade "test" securities to verify the securities processor's reliability prior to actually using the newly-added securities processor in the system. Once the reliability of the new securities processor is established, look-up table 50 can be modified to assign actual securities to that newly-added securities processor.

Concerning the types of assignment entries $52_{1-n}$ that are included in look-up table 50, these entries may be security-specific assignment entries; dedicated assignment entries; id-range assignment entries; or floating assignment entries, for example. Each of these will be discussed below in greater detail.

A security-specific assignment entry is an assignment entry that assigns a specific security (or security symbol) to a specific security processor. An example of a security-specific assignment entry is "XYZ:SP1", in that it assigns security XYZ Corp. to securities processor SP1. However, securities processor SP1 is available to also process trades concerning other securities.

A dedicated assignment entry is an assignment entry that assigns a security to a dedicated securities processor, such that this dedicated securities processor only processes trades concerning that one security. If look-up table 50 does not use wildcards (to be discussed below), every assignment would function as a dedicated assignment until a second security was assigned to the same security processor. An example of this type of dedicated assignment would be "MRV:SP3", since no other security is assigned to securities processor SP3. However, if assignment entries are made that utilize wildcards (to be discussed below), the dedicated assignment entry would have to indicate that the securities processor is exclusively assigned. An example of this type of dedicated assignment is "MRV:~SP3", such that the "~" prefix before the SP3 would be indicative of the exclusivity and, therefore, prevent wildcard assignments from assigning any other securities to securities processor SP3.

An id-range assignment entry is an assignment entry that assigns a range of securities to a specific securities processor. For example, securities beginning with the letters A-L may be assigned to securities processor SP1. The corresponding id-range assignments is "A*-L*:SP1". Note the use of the wildcard symbol "*" to identify any combination beginning with a certain character. Further, these id-range assignments may specify a range of securities beginning with certain numbers, such as "1*-9*:SP3".

A floating assignment entries is an entry that assigns a specific security to any one of a range of securities processors. For example, security "123" may be assigned to the next-available securities processor. Typically, this type of assignment is performed on lower-priority, lightly-traded securities. An example of this type of floating assignment is "123:SP*", such that the wildcard character is used to represent the securities processor assignment. Note that if such wildcard securities processor assignments are used, any dedicated assignment would have to indicate exclusivity for a securities processor to avoid a floating assignment assigning a security to a dedicated securities processor.

Figure 5:
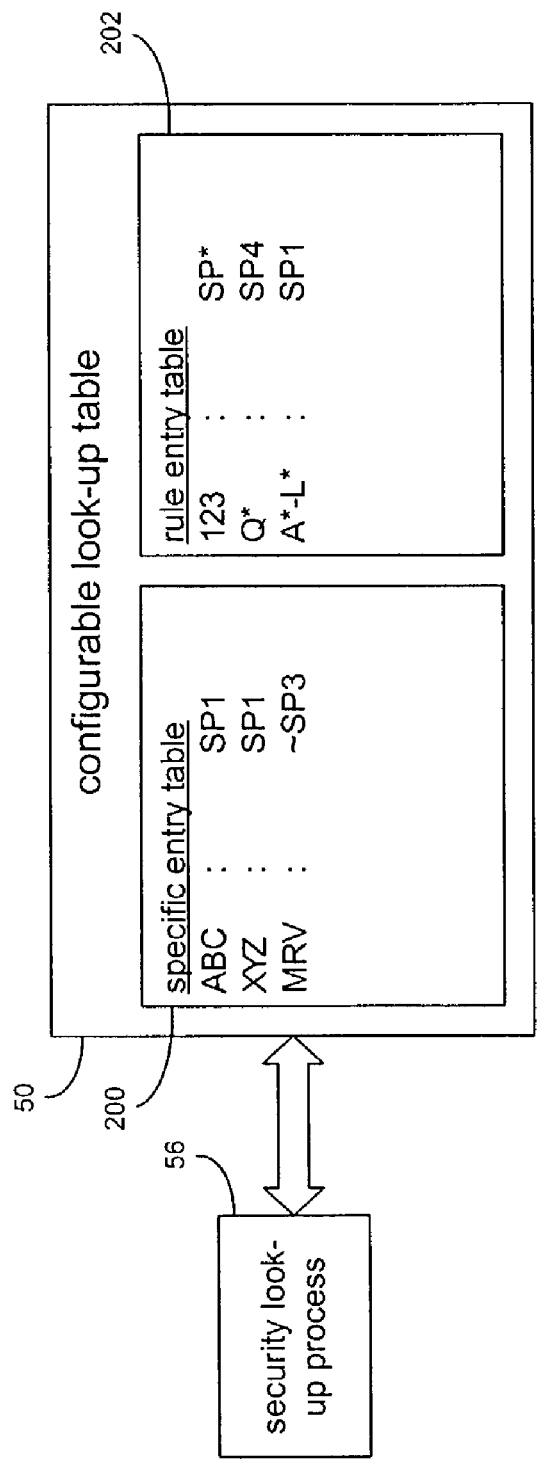
FIG. 5 is a block diagram of a configurable look-up table used by the order routing system.

Referring to FIG. 5, look-up table 50 may be configured to include a specific-entry table 200 and a rule-entry table 202. Specific entry table 200 includes security-specific assignment entries (e.g., XYZ:SP1) and dedicated assignment entries (e.g., MRV:~SP3). Rule entry table 202 includes id-range assignment entries (e.g. A*-L*:SP1) and floating assignment entries (e.g., 123:SP*).

If look-up table 50 is configured to include a specific entry table 200 and a rule entry table 202, security look-up process 56 is configured to first access and search the specific entry table 200 to determine if it includes an assignment entry for the security associated with a received attributable security interest message. If table 200 includes such an entry, security look-up process 56 will stop searching table 50. However, if table 200 does not include such an entry, security look-up process 56 will access and search rule-entry table 202 to determine if it includes an assignment entry for the security associated with the received attributable security interest message.

While FIGS. 1 and 2 are shown to include six securities processors, the actual number of securities processors varies depending on, among other things, system loading and trade volume of computerized trading system 16.

While specific examples were given concerning security-specific assignment entries, dedicated assignment entries, id-range assignment entries, and floating assignment entries, the structure and nomenclature of these entries is for illustrative purposes only. Specifically, administrator 62 and/or the designer of system 16 may choose a nomenclature or syntax that is different than the above-stated examples.

Figure 6:
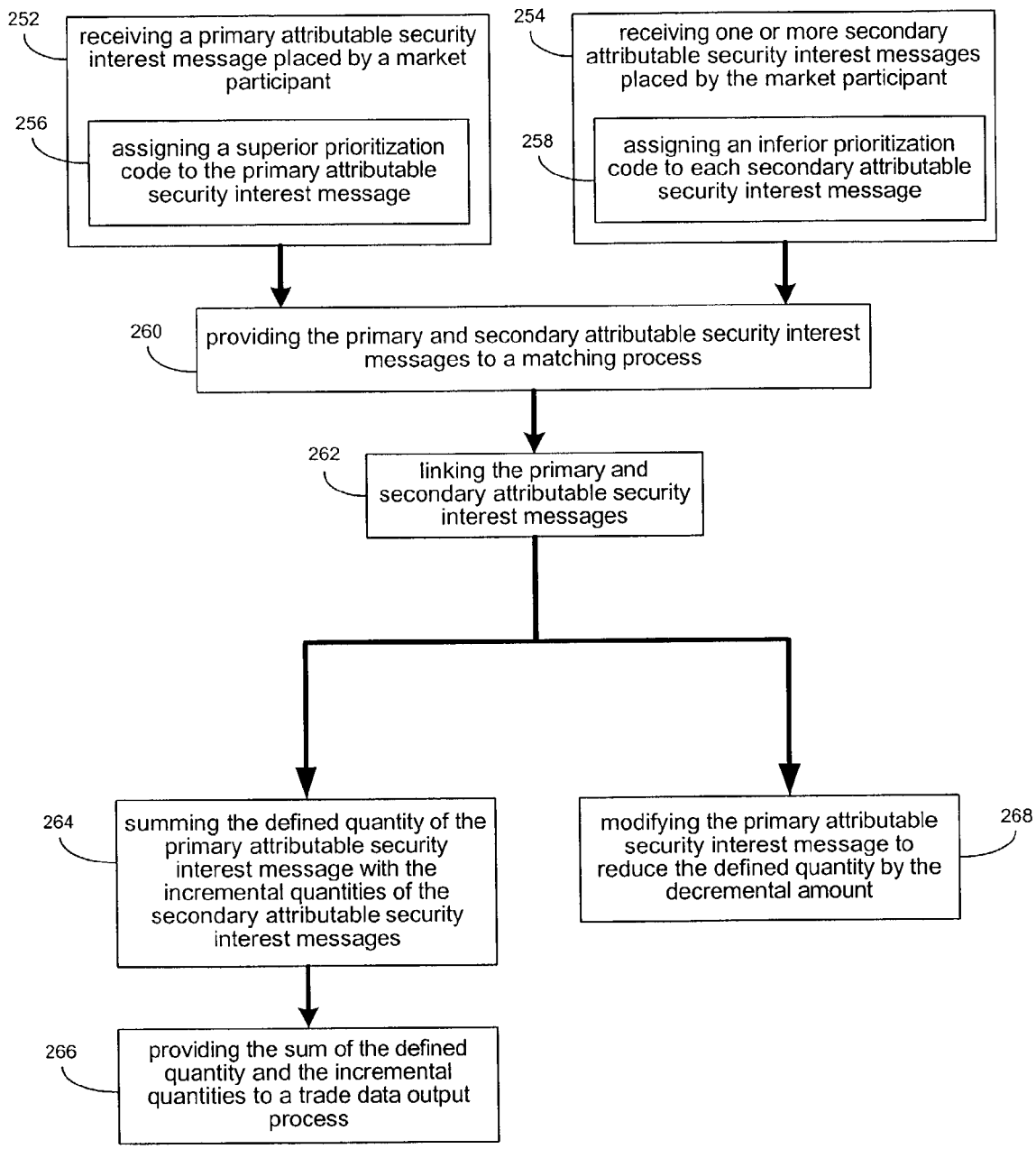
FIG. 6 is a block diagram of a message prioritization method.

Referring to FIG. 6, a message prioritization method 250 includes receiving 252 a primary attributable security interest message placed by a market participant on a securities trading system. The primary attributable security interest message relates to a defined quantity of an individual security traded on the securities trading system. One or more secondary attributable security interest messages, which were placed by the market participant, are also received 254. Each secondary attributable security interest message increments the defined quantity of the primary attributable security interest message by an incremental quantity. The primary attributable security interest message is processed by a matching process prior to the secondary attributable security interest messages.

A superior prioritization code is assigned 256 to the primary attributable security interest message. An inferior prioritization code is assigned 258 to each secondary attributable security interest message. These prioritization codes control the order in which the attributable security interest messages are processed by the matching process, and the inferior prioritization code is subordinate to the superior prioritization code. The prioritization codes are timestamps or sequential numbers.

The primary and secondary attributable security interest messages are provided 260 to a matching process that compares, based on prioritization codes, the primary and secondary attributable security interest messages with previously-received attributable security interest messages to determine if a match occurs between any of these attributable security interest messages. The secondary attributable security interest messages are linked 262 to the primary attributable security interest messages. The defined quantity of the primary attributable security interest message is summed 264 with the incremental quantities of the secondary attributable security interest messages for reporting purposes while maintaining the autonomy of the primary and secondary attributable security interest messages for processing purposes. The sum of the defined quantity and the incremental quantities is provided 266 to a trade data output process that transmits trade data to recipients concerning the processing of the primary and secondary attributable security interest messages. One or more of the secondary attributable security interest messages decrements the defined quantity of the primary attributable security interest message by a decremental amount. The primary attributable security interest message is modified 268 to reduce the defined quantity by the decremental amount.

The message prioritization process described herein is not limited to the hardware embodiment described above; it may find applicability in any computing or processing environment. The message prioritization process may be implemented in hardware, software, or a combination of the two. For example, the message prioritization process may be implemented using circuitry, such as one or more of programmable logic (e.g., an ASIC), logic gates, a processor, and a memory.

The message prioritization process may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the data framer interface. The message prioritization process may also be implemented as a machine-readable storage medium, configured with a computer program, where, upon execution, instructions in the computer program cause a machine to operate to perform the functions of the message prioritization process described above.

Embodiments of the message prioritization process may be used in a variety of applications. Although the message prioritization process is not limited in this respect, the message prioritization process may be implemented with memory devices in microcontrollers, general purpose microprocessors, digital signal processors (DSPs), reduced instruction-set computing (RISC), and complex instruction-set computing (CISC), among other electronic components.

Embodiments of the message prioritization process may also be implemented using integrated circuit blocks referred to as main memory, cache memory, or other types of memory that store electronic instructions to be executed by a microprocessor or store data that may be used in arithmetic operations.

A number of embodiments of the invention have been described. Nevertheless, it will be understood that various modifications may be made without departing from the spirit and scope of the invention.

What is claimed is:

1. An electronic securities trading system comprising:
    a computer system configured to:
        receive a primary attributable security interest message specifying a price and one or more secondary attributable security interest messages that are at the same price as the primary security interest message, the primary and secondary security interest messages placed by the same market participant into the electronic securities trading system, the primary attributable security interest message specifying a defined quantity of an individual security traded on the electronic securities trading system;
        produce a value of a total quantity by summing the defined quantities of the primary and each secondary message for the said same market participant,
        assign a superior prioritization code to the primary attributable security interest message and an inferior prioritization code to each secondary attributable security interest message;
        link the primary and secondary attributable security interest messages for reporting of activities involving the primary and secondary attributable security interest messages for said same market participant; and
        match the primary and secondary attributable security interest messages, with the prioritization codes controlling the order in which the attributable security interest messages for said same market participant are matched to contra side security interest messages in the system, and with the inferior prioritization code being subordinate to the superior prioritization code.

2. The electronic securities trading system of claim 1 wherein the prioritization codes are timestamps.

3. The electronic securities trading system of claim 1 wherein the prioritization codes are sequential numbers.

4. The electronic securities trading system of claim 1 further comprising:
a matching process that compares, based on the prioritization codes, the primary and secondary attributable security interest messages for said same market participant with previously-received attributable security interest messages to determine if a match occurs between any of these attributable security interest messages.

5. The electronic securities trading system of claim 1 further comprising, the system configured to:
display for said same market participant the produced value as the amount of the primary attributable interest message for said same market participant.

6. The electronic securities trading system of claim 5 further comprising:
a reporting process for providing the value of the total of the defined quantity and the incremental quantities to a trade data output process that transmits trade data to recipients concerning the processing of the primary and secondary attributable security interest messages.

7. The electronic securities trading system of claim 1 wherein upon matching of the primary or one or more of the secondary attributable security interest messages, the system is configured to:
decrement the value of the total that is displayed as the defined quantity of the primary attributable security interest message by an amount
corresponding to an amount of the primary attributable security interest message or the one or more of the secondary attributable security interest messages that were match.

8. A method comprising:
receiving in a computer system a primary attributable security interest message specifying a price placed by a market participant on a securities trading system, the primary attributable security interest message relates to a defined quantity of an individual security traded on the securities trading system;
receiving in the computer system one or more secondary attributable security interest messages that are at the same price as the primary security interest message placed by the same market participant;
producing a value of a total quantity by summing the defined quantities of the primary and each secondary message for the said same market participant;
linking the primary and secondary attributable security interest messages for reporting of activities involving the primary and secondary attributable security interest for said same market participant; and
matching in the computer system with the primary attributable security interest message being matched prior to the secondary attributable security interest messages of the same market participant against contra-side security interest messages based on a priority that each of the secondary messages have in the computer system.

9. The method of claim 8 wherein receiving a primary attributable security interest message includes assigning a superior prioritization code to the primary attributable security interest message.

10. The method of claim 9 wherein receiving one or more secondary attributable security interest messages includes assigning an inferior prioritization code to each secondary attributable security interest message, the prioritization codes control the priority by which the attributable security interest messages are processed by the matching process, and the inferior prioritization code is subordinate to the superior prioritization code.

11. The method of claim 10 wherein the prioritization codes are timestamps.

12. The method of claim 10 wherein the prioritization codes are sequential numbers.

13. The method of claim 10 further comprising:
matching, based on prioritization codes, the primary and secondary attributable security interest messages with previously-received contra-side security interest messages to determine if a match occurs.

14. The method of claim 8 further comprising:
disseminating the value for reporting total interest.

15. The method of claim 14 further comprising:
providing the value of the defined quantity and the incremental quantities to a trade data output system that transmits trade data to recipients concerning the processing of the primary and secondary attributable security interest messages.

16. The method of claim 8 wherein upon matching of the primary or one or more of the secondary attributable security interest messages further comprising:
decrementing the value of the total that is displayed as the defined quantity of the primary attributable security interest message by an amount
corresponding to an amount of the primary attributable security interest message or the one or more of the secondary attributable security interest messages that were match.

17. A computer program product residing on a computer readable medium having a plurality of instructions stored thereon which, when executed by the processor, cause that processor to:
receive a primary attributable security interest message placed by a market participant on a securities trading system, the primary attributable security interest message relates to a defined quantity at a defined price of an individual security traded on the securities trading system;
receive one or more secondary attributable security interest messages placed by the same market participant that are at the same price as the primary security interest message; and
produce a value of a total quantity by summing the defined quantities of the primary and each secondary message for the said same market participant,
link the primary and secondary attributable security interest messages for reporting of activities involving the primary and secondary attributable security interest messages for said same market participant;
matching, with prioritization codes assigned to the primary and secondary attributable security interest messages controlling the order in which the attributable security interest messages for said same market participant are matched to contra side security interest messages in the system.

18. The computer program product of claim 17 wherein receiving a primary attributable security interest message includes instructions to assign a superior prioritization code to the primary attributable security interest message.

19. The computer program product of claim 18 wherein receiving one or more secondary attributable security interest messages includes instructions to assign an inferior prioritization code to each secondary attributable security interest message, the prioritization codes control the priority by which the attributable security interest messages are processed by the matching process, and the inferior prioritization code is subordinate to the superior prioritization code.

20. The computer program product of claim 19 wherein the prioritization codes are timestamps.

21. The computer program product of claim 19 wherein the prioritization codes are sequential numbers.

22. The computer program product of claim 19 further comprising instructions to:
match based on prioritization codes, the primary and secondary attributable security interest messages with previously-received contra-side security interest messages to determine if a match occurs.

23. The computer program product of claim 17 further comprising instructions to:
disseminate the value for reporting interest.

24. The computer program product of claim 23 further comprising instructions to:
provide the value of the defined quantity and the incremental quantities to a trade data output process that transmits trade data to recipients concerning the processing of the primary and secondary attributable security interest messages.

25. The computer program product of claim 17 further comprising instructions to:
decrement upon matching of the primary or one or more of the secondary attributable security interest messages the value of the total that is displayed as the defined quantity of the primary attributable security interest message by an amount
corresponding to an amount of the primary attributable security interest message or the one or more of the secondary attributable security interest messages that were match.

26. A message prioritization system comprising:
a computer system
a matching queue in the computer system for receiving and queuing attributable security interest messages for subsequent processing; the computer system configured to:
obtain from the matching queue, a primary attributable security interest message and one or more secondary attributable security interest messages placed by the same market participant, the primary attributable security interest message and each secondary security interest messages being at the same price and each specifying a quantity of an individual security traded on the securities trading system,
produce a value of a total quantity by summing the defined quantities of the primary and each secondary message; and
assign a superior prioritization code to the primary attributable security interest message and an inferior prioritization code to each secondary attributable security interest message; and
link the primary and secondary attributable security interest messages for reporting of activities involving the primary and secondary attributable security interest for said same market participant;
match in the computer system the primary and the secondary attributable security interest messages against other security interest messages according to the prioritization codes with the inferior prioritization code being subordinate to the superior prioritization code for the same market participant.

27. The message prioritization system of claim 26 wherein the matching queue is a first-in, first-out queue maintained in a memory.

28. A message prioritization system comprising:
a computer system configured to
receive a primary attributable security interest message and one or more secondary attributable security interest messages placed by the same market participant on a securities trading system, the primary attributable security interest message and each secondary attributable interest message specifying the same price and specifying a defined quantity of an individual security traded on the securities trading system;
assign a superior prioritization code to the primary attributable security interest message and an inferior prioritization code to each secondary attributable security interest message, the prioritization codes control the order in which the attributable security interest messages are processed by a matching process, and the inferior prioritization code is subordinate to the superior prioritization code;
produce a value of a total quantity by summing the defined quantities of the primary and each secondary message,
link the primary and secondary attributable security interest messages for reporting of activities involving the primary and secondary attributable security interest messages for said same market participant; and
match the primary and secondary attributable security interest messages in accordance with the code assignment against other security interest messages.

29. The message prioritization system of claim 28 wherein the computer is further configured to manage the attributable security interest messages obtained from the code assignment.

30. The message prioritization system of claim 29 wherein the computer includes an order book for storing the attributable security interest messages, an arrangement of the attributable security interest messages within the order book governed, in part, by the prioritization code of each attributable security interest message.

* * * * *